United States Patent Office 2,757,319
Patented July 31, 1956

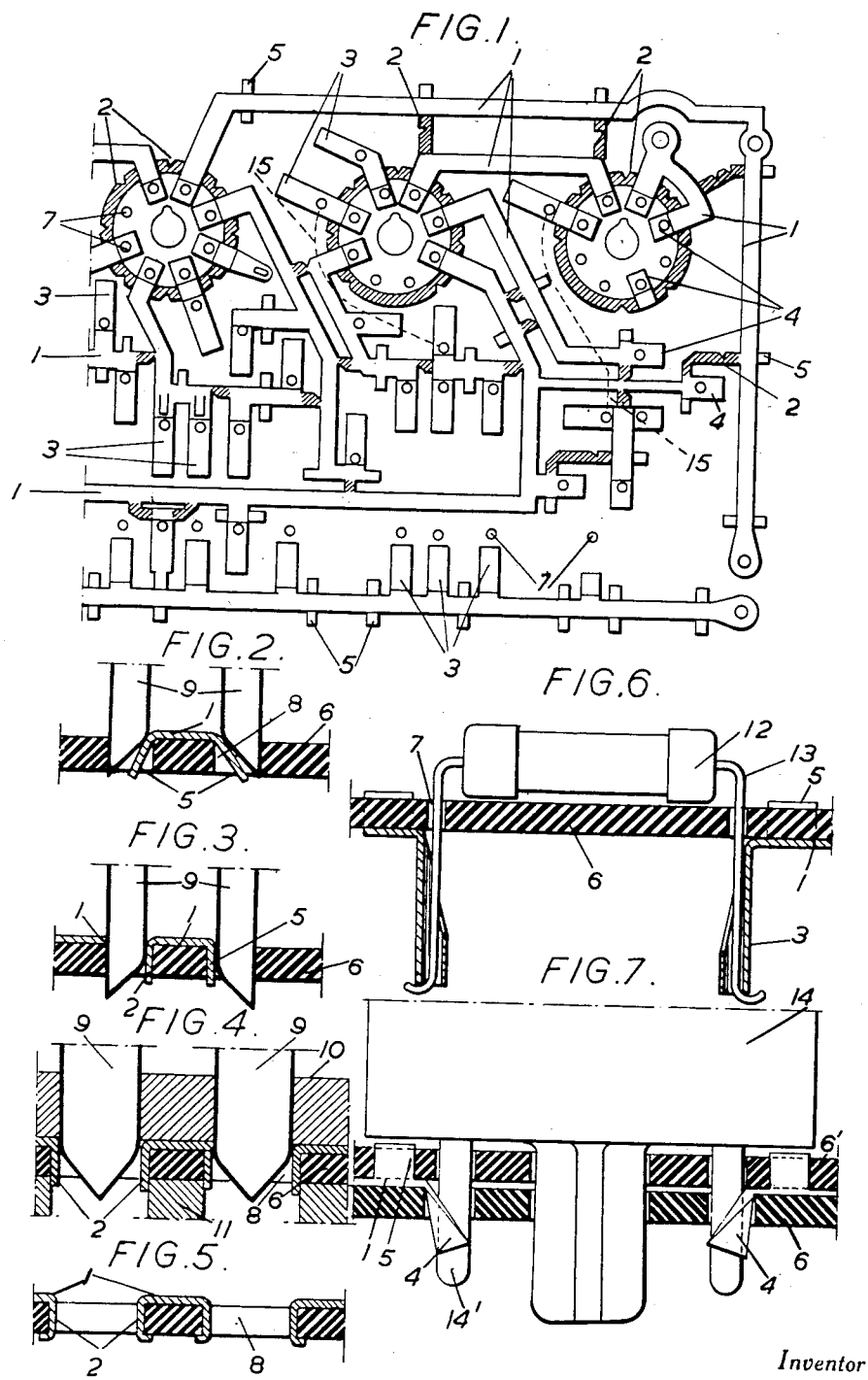

2,757,319

WIRING ASSEMBLY FOR FIXED AND REMOVABLE COMPONENTS

Robert Kapp, Strasbourg, France

Original application April 12, 1949, Serial No. 87,016, now Patent No. 2,694,249, dated November 16, 1954. Divided and this application March 26, 1953, Serial No. 344,710

Claims priority, application France April 16, 1948

4 Claims. (Cl. 317—101)

My invention refers to the manufacture of complex electrical apparatuses such as, for instance, wireless apparatuses, television sets, current rectifying equipments, amplifiers, etc. This application is a division of my application Serial No. 87,016 filed April 12, 1949, and now Patent No. 2,694,249 dated November 16, 1954.

In the manufacture of electric apparatuses of this kind that are provided, as a rule, with a large number of circuit components to be connected together by leads, the installation of the latter, denoted under the term "wiring," calls for numerous and expert workmen. This wiring consists, as a matter of fact, in joining together by wires, insulated as a rule, the various circuit components of the apparatus, these wires being soldered to leads, eyelets or spade terminals with which the circuit components are furnished.

Proposals have already been put forward with the view of substituting methods of connection, that are simpler and quicker to execute, for the work of wiring.

So it is that, in a known method, these connections are carried out, on one or both surfaces of an insulating panel, by spraying of molten metal with the assistance of an oxyhydrogen pistol and of masks or stencils.

In another known method in which the connections are arranged also on one or both surfaces of an insulating panel, these connections are carried out from a thin sheet of metal located on the panel and with the help of a suitable cutting-out tool; the whole of the connections is cut out with a single pressing stroke, the edges of the strips of cut out material being simultaneously inlaid in the mass of the insulating panel.

Lastly there are available, for the execution of such connections, chemical or electro-chemical methods.

However, outside the installation of the connections properly so called, the wiring and the soldering of the circuit components of the apparatus on the panel thus furnished with all the requisite connections also takes up a substantial percentage of man-power. On the other hand, special means, such as eyelets, contact-sockets etc. often are required for connecting, if necessary, the leads of one surface of the panel to those of the opposite surface. Now, the positioning of these eyelets, whether it is done by hand or by some mechanical means involves a substantial amount of work.

In order to trim out these inconveniences to a certain extent, steps have been taken up to the point of making up certain components, such as fixed condensers and inductance-coils, by calling in the aid of the methods as disclosed above. These parts, arranged as an extension of the leads, are thus an integral part of the supporting panel.

This manner of procedure, that may be suitable for simple equipment, exhibits substantial inconveniences for more complicated equipment, such as wireless apparatuses with a large number of vacuum tubes or valves and intricate wiring, since it forces, in the majority of cases, the scrapping of the whole panel, that is to say the main item of the apparatus if a single one of these parts becomes faulty.

The object of my invention is, on the one hand, to effect a very appreciable saving in man-power in the installation of the connections as well as in the wiring and the soldering of the circuit components of the apparatus and, on the other hand, to enable the faulty items to be easily replaced.

The new manufacturing method also has in view the arrangement of all the leads of at least a portion, for instance, of the main portion, of the equipment or apparatus on one or both surfaces of an insulating panel, these connections being adapted however, so that, beside their function as conductors properly so called, they may be used for the removable circuit components, or as circuit components or portions of circuit components such as inductance-coils, condensers, commutator or switch contacts, etc. or else, as supports for the fixed circuit components of the apparatus, the latter connections being adapted in such a manner that the attachment thereon of the connectors of said fixed circuit components may be achieved in one single operation (soldering for example) on all attachment points.

In the new method according, use is made of at least one metallic grid comprising elements intended to constitute the leads on one of the surfaces of an insulating panel furnished with openings, temporary coupling bridges joining together the said elements until they are positioned on the panel, projections rigid with the said elements and intended to be used as contact means for the stationary and the removable circuit components of the apparatus and lugs rigid with the said elements and intended for the fastening of the latter on the panel. After the positioning of the grid on the panel, the temporary coupling bridges are sheared and certain portions of the sheared bridges and the fastenings lugs are folded back in the openings of the panel, in order that the lead elements may be fastened to the said panel.

The grid is obtained to advantage by cutting out, in the press, of a metallic sheet and the lead elements correspond substantially to the outline of the wiring to be carried out. The grid may also be obtained by means of a photo-engraving method.

The shearing and folding back of the temporary coupling bridges as well as the folding back of the clips is carried out to advantage in the press, in one single operation.

An insulating panel is thus quickly obtained carrying leads separated from each other through the shearing of the coupling bridges.

According to the invention, the projections intended to be used as means of contact with the removable circuit components take a smaller length than those intended to be used as means of contact with the stationary or fixed circuit components and the latter projections have such a length that, after having been bent substantially at right angles with respect to the plane of the grid, their ends (used for the attachment of the fixed circuit components) are all arranged in a plan substantially parallel to the grid and distant from the shorter projections.

The fastening of the fixed circuit components on the corresponding contacting projections is then carried out on the same plane in one single and common soldering operation.

It is as well to arrange as high a number as possible of circuit components or units on the same side of the lead panel. For a wireless receiving apparatus there will be placed, for instance, all the fixed resistances, all the fixed condensers, the valves and the medium frequency transformers as well as the tuning-in unit on the upper surface of the panel, the pre-positioned connections (grid elements) of the panel being on the lower surface thereof. The branch leads of these circuit components will go through holes arranged in the connection panel to join up, on the other side of the panel, with the projections bent at right angles and constituting the extension of the pre-positioned connections as disclosed above. In the same way, the leads located on the upper surface of the same panel and, that must join up with the leads located on the lower surface, will be furnished with extensions bent at right angles that pass through openings cut in the panel, and join up with the appropriate long projections of the lower leads.

All the circuit components of the apparatus are therefore arranged on one of the surfaces of the panel, preferably the upper one, while all the contact spots to be connected up by soldering are located on the other side of the panel in order to permit a single and common soldering operation.

When everything is positioned, all that has to be done is to dip in a horizontal manner all the contact places, first of all in a liquid pickling bath, and then in a molten solder bath so as to perform at one and the same time all the solderings to be carried out. As the contacts placed to be connected together by soldering extend more from the lower surface of the panel than the contacts in which are engaged the plugs of the removable circuit components of the electric apparatus, the latter contacts do not touch the pickling and soldering baths.

My invention comprises the new article of manufacture that is formed by a metallic grid for the completion of a panel for electric leads, a grid provided with lead elements properly so called connected by temporary coupling bridges for the positioning of the said elements, lugs rigid with the said elements for fastening on an insulating support and projections, bent substantially at right angles with respect to the grid plane, to be used as contact means for the fixed and/or removable parts or as electrical units or unit circuit components such as inductance-coils, condensers, etc. the projections intended for connecting the fixed circuit components having a greater length than the projections intended for connecting the removable circuit components.

The main object of my invention is the new article of manufacture that is formed by an electrical apparatus of which at least one portion of the wiring is carried out from a metallic grid and through the putting into operation of the method specified hereinabove, said apparatus being characterized by the fact that the contact points of the wiring with fixed circuit components of said apparatus are located at some distance from a connection supporting panel and substantially in a plane parallel to said panel.

The accompanying drawings illustrate as an example, a practical working up of the invention.

Fig. 1 is a plan view of a grid portion before it is fastened on an insulating support-panel.

Figs. 2 to 5 illustrate, on a larger scale, certain shearing operations of the bridge and folding-back operations for the fastening means.

Fig. 6 shows the fastening of a stationary unit or circuit component on contact projections.

Fig. 7, finally, illustrates a movable circuit component or unit mounted on a connection panel.

The metallic grid obtained for example by cutting out in the press, a grid as illustrated in plan in Fig. 1, comprises connectors 1, temporary bridges 2 intended to hold them together, projections 3 and 4, and lugs 5 intended to constitute respectively the connecting means for the stationary unit or circuit components of the apparatus, the contact sockets for the removable units and the clamping members of the leads.

The outline as selected in the drawing, for instance for the grid may be regarded as arbitrary and is not important as far as the representation of the method is concerned. The temporary bridges 2 may be recognized by fine hatching. The projections 3 and 4 grafted on the leads will be bent at a right angle and rolled over in the form of eyelets or sockets before the grid is positioned on the supporting panel 6 made of insulating material.

This panel is provided with holes 7 for the passage of the connecting wires of the fixed units or circuit components of the apparatus and, at the places where will be located the temporary bridges 2 and the lugs 5, openings 8, in which these circuit components are folded back to ensure the securing of the grid to the insulating panel.

Figs. 2 to 5 illustrate in section and on enlarged scale different places of the grid where this operation is employed.

In Fig. 2, the dies 9 of the press tool only cause the folding back of the lugs 5 rigid with the lead members 1, in two openings 8 having substantially the same outlines and cut in the panel 6. After this folding back, the said lugs should come level with the opposite surface of the panel or slightly go beyond it. In this latter case, the protruding ends will be folded over on the said surface. In both cases, these lugs act after the manner of clamps ensuring the holding in position of the connector 1 on the insulating panel.

Fig. 3 shows a substantially identical operation carried out at right angles with a temporary bridge 2, on the one hand, and with a lug 5, on the other hand. In this case, the die 9 of the press tool is arranged so as to cut off first of all unilaterally the temporary bridge 2 of the connector 1 of which it ensured the coupling with the other parts of the grid. Then, this bridge is folded back just as the fastening lug 5 in the openings 8 arranged for this purpose out in the insulating panel 6.

Fig. 4 illustrates the section of a spot where two temporary bridges 2 will be severed in the middle and their two halves folded back into the subjacent openings 8.

Fig. 4 shows at the same time a modification of the press tool that is provided in this case with a press-plate 10 for guiding the dies 9 and pressing the panel 6 on the bottom tool 11 during the shearing and folding-back operation.

The portions of the temporary bridges 2 not essential for the fastening of the leads will be cut out at the time of this same operation.

Fig. 5 illustrates in section the same spot of the grid as Fig. 4 after the folding back of the protruding ends of the severed coupling bridges 2.

Obviously through the special fitting up of the press tool that is provided with as many dies as there are cuttings and fastenings to be made, all these operations are made through a single press stroke and, possibly, through a second stroke for the folding back of the protruding ends. There is thus at one and the same time the splitting up of the grid into a predetermined number of connectors, separated from each other and fastening of these connectors, as well as of contacting projections that are rigid with them, on the supporting panel.

Fig. 6 illustrates the putting into position of a fixed circuit component or unit such as a condenser 12 of the electric apparatus on the supporting panel 6. The wires 13 of this circuit component or unit go successively into the holes 7 of the panel and into the eyelets of the projections 3 rolled as spade terminals and after a cutting out beyond the projections, said wires are folded back, as illustrated, in order to ensure the keeping of the condenser 12 in temporary position. The final coupling between this unit and the connections is effected by simultaneous soldering for all the similar circuit components to be inserted in the various circuits of the electric apparatus. For this purpose, the ends of the projections and the ends of connecting wires 13 are dipped first of all in the pickling bath, then in a bath of molten tin.

It will be readily understood that this joint soldering operation and the other steps of the method as disclosed enable a distinct saving to be made in man-power and, above all, in highly skilled labour and consequently securing an appreciable lowering in the net cost of electric equipments built up on these lines.

Fig. 7 illustrates the wiring of a removable circuit component or unit, here shown as a base of a tube 14 on the supporting panel 6. There is no question here of the use of a special stand or base fitted to the panel, but only of a duplication 6' intended to ensure a better guiding of the contact plugs 14' of the removable tube 14 that are introduced in the holes 7 of the panel and then go into the contact-sockets as constituted by the projections 4 rolled over as eyelets. It will be observed that these sockets are much shorter than the projections 3. Thus, they will not be dipped in the tin-bath at the time of the soldering operation.

The adaptation, as disclosed hereinabove, of the method to the manufacture of a wireless receiving apparatus is obviously only one of the many adaptations to which this same method might be applied in the building up of other complicated electric equipments or apparatuses.

In certain cases, all or nearly all of the leads may be positioned on one single side of the supporting panel. In such cases, there will be no necessity of erecting two lead grids, one alone being enough, while the second one may be replaced by one or more wire ends folded over in U-shape and of which the parts curved at right angles will join up, for the soldering operation, with the side of the panel carrying the connection grid. The diagram illustrated in Fig. 1 allows such couplings 15 to be seen in dotted lines.

What I claim is:

1. As a new manufactured article, a wiring assembly for complex electrical apparatus having fixed and removable circuit components, comprising at least one insulating panel having a plurality of holes therein, and metal strips forming connectors rigidly mounted on at least one surface of said panel, a plurality of fastening lugs integral with said strips and bent into a portion of said holes of the panel securing said connectors to the panel, strip projections of different lengths integral with said metal strips, bent at substantially right angles from the panel surface and so shaped to form connecting means for connecting with the removable and fixed circuit components of the apparatus, the strip projections for the fixed circuit components being longer than the strip projections for the removable circuit components and having such a length that their ends all lie in the same plane equi-distant from the surface of the panel, in order to allow the final coupling of the fixed circuit components with the connectors in a single step.

2. As a new manufactured article, a complex electrical apparatus having fixed circuit components with connecting wires, removable circuit components with contact plugs, and a wiring assembly, comprising at least one insulating panel having a plurality of holes therein, and metal strips forming connectors rigidly mounted on at least one surface of said panel, a plurality of fastening lugs integral with said strips and bent into a portion of said holes of the panel securing said connectors on to the panel, strip projections of different lengths integral with the strips, bent from the panel surface and rolled over to form connecting means for the connecting with removable and fixed circuit components of the apparatus, the strip projections for the fixed circuit components being longer than the strip projections for the removable circuit components and having such a length that their ends all lie in the same plane, the ends of the wires of the fixed components being located in the rolled longer projections and coupled thereto by soldering.

3. A complex electrical apparatus having fixed circuit components with connecting wires, removable circuit components with contact plugs and a wiring assembly, comprising at least one insulating panel having a plurality of holes therein, a metallic sheet grid having a plurality of precut connector strips, a plurality of temporary bridges joining said connector strips, a plurality of strip projections integral with said connector strips a portion of which are of one length and the remainder of which are of a longer length, and a plurality of fastening lugs integral with said connector strips, said fastening lugs and said temporary bridges being bent into said holes in said insulating panel securing said connector strips thereto, and said strip projections being bent at substantially right angles away from the surface of said panel in a direction opposite to the fastening lugs and temporary bridges to form connecting means, the longer of said strip projections having their ends in the same plane.

4. A wiring assembly for complex electrical apparatus having fixed circuit components with connecting wires and removable circuit components with contact plugs, comprising at least one insulating panel having a plurality of holes therein, metal strips forming connectors rigidly mounted on at least one surface of said panel, a plurality of strip projections integral with said metal strips and bent at substantially right angles to the panel surface and being shaped to form connecting means for connecting with the removable and fixed circuit components of the apparatus, a portion of said strip projections being of a length such that the ends thereof end in the same plane and are adapted to receive the connecting wires of said fixed circuit components, and the remainder of said strip projections being of a length such that they terminate between the panel and the plane in which the ends of said portion of the strip projections end, said remainder of strip projections being adapted to receive the contact plugs of said removable circuit components.

References Cited in the file of this patent

UNITED STATES PATENTS

| 2,066,876 | Carpenter et al. | Jan. 5, 1937 |
| 2,312,181 | Matthews | Feb. 23, 1943 |
| 2,399,753 | McLarn | May 7, 1946 |
| 2,492,235 | Mitchell | Dec. 27, 1949 |
| 2,613,252 | Heibel | Oct. 7, 1952 |
| 2,631,184 | Sampson | Mar. 10, 1953 |

FOREIGN PATENTS

| 688,530 | Great Britain | Mar. 11, 1953 |